United States Patent [19]
Eckel et al.

[11] Patent Number: 5,223,572
[45] Date of Patent: Jun. 29, 1993

[54] IMPACT RESISTANT THERMOPLASTIC MOULDING COMPOUNDS OF AROMATIC POLYESTER CARBONATES AND POLYALKYLENE TEREPHTHALATES

[75] Inventors: Thomas Eckel, Dormagen; Dieter Wittmann, Cologne; Jochen Schoeps, Krefeld; Horst Peters; Karl-Heinz Ott, both of Leverkusen, all of Fed. Rep. of Germany

[73] Assignee: Bayer Aktiengesellschaft, Leverkusen, Fed. Rep. of Germany

[21] Appl. No.: 617,925

[22] Filed: Nov. 21, 1990

Related U.S. Application Data

[63] Continuation of Ser. No. 393,239, Aug. 14, 1989, abandoned.

[30] Foreign Application Priority Data

Aug. 24, 1988 [DE] Fed. Rep. of Germany ....... 3828690

[51] Int. Cl.$^5$ .................. C08L 69/00; C08L 67/02
[52] U.S. Cl. ......................... 525/67; 525/64
[58] Field of Search ................ 525/64, 67, 310

[56] References Cited

U.S. PATENT DOCUMENTS

| | | | |
|---|---|---|---|
| 4,677,150 | 6/1987 | Chacko | 525/67 |
| 4,778,853 | 10/1988 | Belfoure | 525/67 |
| 4,804,708 | 2/1989 | Wittmann et al. | 525/67 |
| 4,866,123 | 9/1989 | Wittmann | 525/67 |

FOREIGN PATENT DOCUMENTS

| | | | |
|---|---|---|---|
| 135779 | 4/1985 | European Pat. Off. | 525/67 |
| 0141268 | 5/1985 | European Pat. Off. | |
| 0231052 | 8/1987 | European Pat. Off. | |
| 0237872 | 9/1987 | European Pat. Off. | |
| 270948 | 6/1988 | European Pat. Off. | 525/310 |
| 0270950 | 6/1988 | European Pat. Off. | |
| 0304787 | 3/1989 | European Pat. Off. | |
| 128055 | 5/1988 | Japan | |

Primary Examiner—David J. Buttner
Attorney, Agent, or Firm—Connolly and Hutz

[57] ABSTRACT

Thermoplastic moulding compounds based on fully aromatic polyester carbonates polyalkylene terephthalates and grafted diene rubber have a well balanced combination of notched impact strength at room temperature and low temperatures and high weld line strength and may be used for the production of moulded articles, in particular by injection moulding.

7 Claims, No Drawings

IMPACT RESISTANT THERMOPLASTIC MOULDING COMPOUNDS OF AROMATIC POLYESTER CARBONATES AND POLYALKYLENE TEREPHTHALATES

This application is a continuation of application Ser. No. 07/393,239 filed Aug. 14, 1989 now abandoned.

This invention relates to thermoplastic moulding compounds based on fully aromatic polyester carbonates, polyalkylene terephthalates and grafted diene rubber, to a process for their preparation by mixing the components at an elevated temperature and to their use for the production of moulded articles, particularly by injection moulding.

Impact resistant mixtures of aromatic polyester carbonates and polyalkylene terephthalates are known.

According to EP 0 137 230, the addition of impact strength modifiers improves the toughness of mixtures of aromatic polyester carbonates and polyalkylene terephthalates.

Blends of polyester carbonates and polyalkylene terephthalates which have been modified in their impact strength by butadiene-based graft polymers with a multistage structure are described in EP 0 135 779. This modifier comprises a basis of butadiene and styrene, an intermediate phase of styrene and a graft shell of methyl methacrylate and butanediol methacrylate. The incorporation of a cross-linking agent into the graft shell is essential for obtaining the desired level of properties. The aliphatic/aromatic polyester may be a polyethylene terephthalate and/or a polycyclohexane dimethanol terephthalate.

Mixtures of polyester carbonates and polyalkylene terephthalates which have been impact strength modified by graft polymers of methyl methacrylate on acrylate rubber are described in EP 0 155 989.

According to U.S. Pat. No. 4,677,150, a graft polymer consisting of an acrylate or butadiene basis and a shell of styrene and methyl methacrylate is suitable for improving the impact strength of polyester carbonate/polyalkylene terephthalate mixtures.

Diene, acrylate and EPDM rubbers in general are proposed in EP 0 237 872 for modifying polyester carbonate/polyethylene terephthalate blends. The polyester carbonates claimed have an ester component of from 65 to 95%, of which 80 to 98 mol-% consists of isophthalic acid units and 20 to 2 mol-% consists of terephthalic acid units.

For many applications of such moulding compounds, in particular in the motor vehicle industry, the materials are required to have not only a high notched impact strength both at room temperature and at low temperatures and good processing properties but also sufficient weld line strength. This is necessary to ensure that large injection moulded parts with several feed points may be obtained in a sufficiently high quality.

Although moulding compounds of aromatic polyester carbonates and polyalkylene terephthalates which are sufficiently tough at room temperature and low temperatures for numerous applications may be obtained by means of rubber modifiers based on butadiene rubbers, as described in U.S. Pat. No. 4,677,150 and EP 0 135 779, large injection moulded parts produced with such modifiers are unsatisfactory in their mechanical properties in that their weld line strength is too low, for example due to a cross-linked graft shell. The weld line strength of moulded parts is improved by using methyl methacrylate-grafted acrylate rubbers (EP 0 155 989) in blends of aromatic polyester carbonates and polyalkylene terephthalates, but only at the expense of a considerable reduction in the toughness at low temperatures.

It has now surprisingly been found that mixtures of fully aromatic polyester- carbonates, polyalkylene terephthalates and grafted diene rubbers may be worked up into moulding compounds which have an advantageous combination of high notched impact strength at room temperature and at low temperatures and high weld line strength by using special grafted, particulate diene rubbers. The diene graft rubbers according to the invention have a special graft shell which consists predominantly of methyl methacrylate and smaller proportions of at least one acrylic acid ester of a primary or secondary, monohydric aliphatic alcohol or of tert.-butanol. The combination of properties according to the invention is preserved even when part of the aromatic polyester-carbonate is replaced by polycarbonate.

This invention relates to thermoplastic moulding compounds containing

A. from 5 to 99 parts by weight, preferably from 10 to 95 parts by weight, most preferably from 50 to 90 parts by weight of a fully aromatic polyester-carbonate, B. from 1 to 95 parts by weight, preferably from 5 to 90 parts by weight, most preferably from 10 to 50 parts by weight of one or more thermoplastic polyalkylene terephthalates and C. from 1 to 60 parts by weight, preferably from 2 to 50, especially from 3 to 40 parts by weight of a graft polymer of C.1 from 5 to 90 parts by weight, preferably from 10 to 70, in particular from 15 to 50 parts by weight of a mixture of C.1.1. from 20 to 99 parts by weight, preferably from 50 to 97, in particular from 70 to 95 parts by weight of methyl methacrylate and C.1.2 from 1 to 40 parts by weight, preferably from 1 to 20 parts by weight of an acrylic acid ester of a primary or secondary, monohydric aliphatic $C_2$-$C_{10}$ alcohol and optionally C.1.3 from 0.1 to 10 parts by weight, preferably from 0.5 to 4 parts by weight of an acrylic or methacrylic acid ester of tert.-butanol and/or C.1.4 from 0.1 to 30 parts by weight, preferably from 0.5 to 20 parts by weight, of a mixture of from 50 to 95 parts by weight of styrene, α-methylstyrene, a styrene which is substituted in the nucleus by $C_1$-$C_4$-alkyl or by halogen, or mixtures thereof, and from 5 to 50 parts by weight of acrylonitrile, methacrylonitrile, maleic acid anhydride, a $C_1$-$C_4$-alkyl-substituted or a phenyl-N-substituted maleimide or mixtures thereof, in which the sum of the parts by weight of C.1.1 and C.1.2 and, if used, C.1.3 and/or C.1.4 should amount to 100 parts by weight, on C.2 from 10 to 95 parts by weight, preferably from 30 to 90, in particular from 50 to 85 parts by weight of a cross-linked diene rubber having an average particle diameter $d_{50}$ of from 0.05 to 1 μm, preferably from 0.05 to 0.8 μm, especially from 0.05 to 0.6 μm, and a gel content above 50% by weight, preferably above 70, most preferably from 73 to 98% by weight, based on the weight of C.2, in which the sum of the parts by weight of A, B and C should amount to 100 parts by weight.

Component A

Fully aromatic polyester carbonates A in the context of this invention are built up predominantly or entirely of aromatic $C_1$–$C_{14}$-dicarboxylic acids, $C_6$–$C_{30}$-diphenols and carbonic acid derivatives, e.g. phosgene.

The following are examples of preferred aromatic dicarboxylic acids: Isophthalic acid, terephthalic acid, diphenylether-4,4'-dicarboxylic acid, naphthalene-2,6-dicarboxylic acid and any mixtures of these acids. Iso- and terephthalic acid are particularly preferred. The preferred carbonic acid derivative is phosgene.

Preferred diphenols for the preparation of the fully aromatic polyester carbonates A are compounds corresponding to the following formula I:

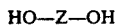  (I)

wherein

Z denotes a divalent mononuclear or multinuclear aromatic group containing 6 to 30 carbon atoms and is so constructed that the two OH groups are each directly attached to a carbon atom of an aromatic system.

Particularly preferred diphenols are compounds corresponding to the following formula II

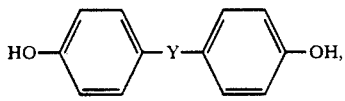  (II)

wherein

Y denotes a single bond, an alkylene or alkylidene group containing 1 to 7 carbon atoms, a cycloalkylene or cycloalkylidene group containing 5 to to 12 carbon atoms,

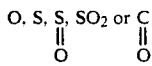

and derivatives of these compounds alkylated or halogenated in the nucleus, e.g.: hydroquinone, resorcinol, dihydroxydiphenyls, bis-(hydroxyphenyl)-alkanes, bis-(hydroxyphenyl)-cycloalkanes, bis-(hydroxyphenyl).ethers, bis-(hydroxyphenyl)-ketones, bis-(hydroxyphenyl) sulphoxides, bis-(hydroxyphenyl)-sulphones and α,α-bis-(hydroxyphenyl)-diisopropylbenzenes and derivatives thereof which are alkylated or halogenated in the nucleus.

The following are the most important diphenols: Bisphenol A, tetramethyl bisphenol A, 1,1-bis-(4-hydroxyphenyl)-isobutane, 1,1-bis-(4-hydroxyphenyl)-cyclohexane, 4,4'-dihydroxy-diphenylsulphide, 4,4'-dihydroxy-diphenylsulphone and the di- and tetrahalogenated derivatives thereof. Bisphenol A is particularly preferred. Any mixtures of the above-mentioned diphenols may also be used.

Possible branching agents are mentioned in DE-OS 2 940 024 and 3 007 934.

The chain terminating agents used for the fully aromatic polyester carbonates A are preferably phenol, alkyl phenols containing $C_1$–$C_{12}$-alkyl groups, halogenated phenols, hydroxydiphenyl, naphthols, chlorocarbonic acid esters of such phenolic compounds and chlorides of aromatic monocarboxylic acids optionally substituted with $C_1$–$C_{22}$ alkyl groups and halogen atoms. These chain terminating agents may be used in quantities of from 0.1 to 10 mol-% (based on diphenols in the case of phenols and on acid chlorides in the case of acid chlorides). The chlorides of aliphatic monocarboxylic acids containing up to 22 carbon atoms may also be used.

For synthesizing the fully aromatic polyester carbonates A, up to 30 mol-%, preferably from 0 to 20 mol-%, of the dicarboxylic acids and dihydroxy compounds may be replaced by aliphatic groups, e.g. adipic acid or butane-1,4-diol.

The fully aromatic polyester carbonates A may be partly built up of aromatic hydroxycarboxylic acids such as p-hydroxybenzoic acid. The proportion of such hydroxycarboxylic acids may be up to 100 mol-% but is preferably from 30 to 50 mol-% (based on bisphenol).

When both iso- and terephthalic acid take part in the synthesis of the fully aromatic polyester carbonates A, the terephthalic acid component may amount to 1 to 99% of the total ester component, preferably from 25 to 75%.

The fully aromatic polyester carbonates may contain from 1 to 99 mol-%, in particular from 30 to 80 mol-%, of ester groups, based on the sum of ester groups and carbonate groups.

Both the ester component and the carbonate component of the fully aromatic polyester carbonates A may be in the form of blocks or distributed randomly in the polycondensate.

The preparation of fully aromatic polyester carbonates A is known and has been described, for example, in DE-OS 1 495 626, 2 232 877, 2 706 376, 3 000 610, 2 714 544, 2 940 024 and 3 007 934 and in U.S. Pat. No. 3,169,121. The phase interface process is particularly preferred.

The relative solution viscosity ($n_{rel}$) of the fully aromatic polyester carbonates A is in the range of from 1.18 to 1.4, preferably from 1.22 to 1.3 (determined on solutions of 0.5 g of polyester carbonate A in 100 ml of $CH_2Cl_2$ solution at 25° C.).

The carbonate group content may also be adjusted to the desired level by mixing fully aromatic polyester carbonates with aromatic polycarbonates. This means that component A is in accordance with this invention even if the fully aromatic polyester carbonate is partly replaced by an aromatic polycarbonate, i.e. to an extent of 5 to 95% by weight, preferably 10 to 50% by weight.

The aromatic polyester carbonates used may be homopolycarbonates or copolycarbonates. These are described, for example, in U.S. Pat. No. 2,999,835, GB-PS 772 627 and DE-OS 3 334 872.

Component B

Polyalkylene terephthalates used as component B for the purpose of this invention are reaction products of aromatic dicarboxylic acids or their reactive derivatives (e.g. dimethylesters or anhydrides) and aliphatic, cycloaliphatic or arylaliphatic diols or mixtures of these reaction products.

Preferred polyalkylene terephthalates used as component B may be prepared by known methods from terephthalic acids (or their reactive derivatives) and aliphatic or cycloaliphatic diols containing from 2 to 10 carbon atoms (Kunststoff-Handbuch, Volume VIII pages 695 et seq, Carl Hanser Verlag, Munich 1973).

Preferred polyalkylene terephthalates used as component B contain from 80 to 100 mol-%, preferably from 90 to 100 mol-%, based on the dicarboxylic acid component, of terephthalic acid groups and from 80 to 100 mol-%, preferably from 90 to 100 mol-%. based on the diol component, of ethylene glycol and/or butane-1,4-diol groups.

In addition to containing terephthalic acid groups, the preferred polyalkylene terephthalates B may contain from 0 to 20 mol-% of residues of other aromatic dicarboxylic acids containing from 8 to 14 carbon atoms or of aliphatic dicarboxylic acids containing from 4 to 12 carbon atoms, such as residues of phthalic acid, isophthalic acid, naphthalene-2,6-dicarboxylic acid, 4,4'-diphenyldicarboxylic acid or succinic, adipic, sebacic, azelaic or cyclohexane diacetic acid.

In addition to containing ethylene glycol and butane-1,4-diol residues, the preferred polyalkylene terephthalates B may contain from 0 to 20 mol-% of other aliphatic diols containing 3 to 12 carbon atoms or cycloaliphatic diols containing 6 to 12 carbon atoms, e.g. residues of propane-1,3-diol, 2-ethylpropane-1,3-diol, neopentyl glycol, pentane-1,5-diol, hexane-1,6-diol, cyclohexane-1,4-dimethanol, 3-methylpentane-1,3- and -1,6-diol, 2-ethylhexane-1,3-diol, 2,2-diethylpropane-1,3-diol, hexane-2,5-diol, 1,4-di(8-hydroxyethoxy)-benzene, 2,2-bis(4-hydroxycyclohexyl)-propane, 2,4-dihydroxy-1,1,3,3-tetramethylcyclobutane, 2,2-bis-(3-ϵ-hydroxyethoxyphenyl)-propane and 2,2-bis-(4-hydroxypropoxyphenyl)-propane (DE-OS 2 407 647, 2 407 776 and 2 715 932).

The polyalkylene terephthalates used as component B may be branched by the incorporation of relatively small quantities of trihydric or tetrahydric alcohols or tribasic or tetrabasic carboxylic acids as described in DE-OS 1 900 270 and U.S. Pat. No. 3,692,744. Trimesic acid, trimellitic acid, trimethylolethane, trimethylolpropane and pentaerythritol are examples of preferred branching agents. It is advisable not to use more than 1 mol-% of the branching agent, based on the acid component.

Particularly preferred polyalkylene terephthalates B are those which have been prepared entirely from terephthalic acid and reactive derivatives thereof (e.g. its dialkylesters) and ethylene glycol and/or butane-1,4-diol, and mixtures of these polyalkylene terephthalates.

Copolyesters prepared from at least two of the above-mentioned alcohol components are also preferred polyalkylene terephthalates B. Poly-(ethylene glycol/butane-1,4-diol)terephthalates are particularly preferred copolyesters.

The polyalkylene terephthalates which are preferably used as component B generally have an intrinsic viscosity of from 0.4 to 1.5 dl/g, preferably from 0.5 to 1.3 dl/g, especially from 0.6 to 1.2 dl/g, determined in phenol/odichlorobenzene (1:1 parts by weight) at 25° C.

Component C

Preferred graft polymers C are those which are prepared by graft polymerisation of from 5 to 90 parts by weight, preferably from 10 to 70, especially from 15 to 50 parts by weight, of at least one vinyl monomer mixture of methyl methacrylate and an acrylic acid ester of a primary or secondary monohydric, aliphatic $C_2$-$C_{10}$ alcohol, such as n-butyl acrylate, on 10 to 95 parts by weight, preferably 30 to 90, especially 50 to 85 parts by weight of a particulate, cross-linked diene rubber.

From 0.1 to 10 parts by weight of the acrylic or methacrylic acid ester of tertiary butanol and/or from 0.1 to 30 parts by weight of a mixture of styrene or α-methylstyrene and acrylonitrile, methacrylonitrile or maleic acid anhydride may in addition be grafted as graft monomers on the rubber base.

Mixtures of methyl methacrylate and n-butyl acrylate used in proportions of from 85:15 to 98:2 and mixtures thereof with tert.-butyl acrylate and/or with styrene and acrylonitrile (ratio 72 to 28) are particularly preferred graft monomers.

Cross-linked homo- and/or copolymers of conjugated $C_4$-$C_6$-dienes are preferred diene rubbers C.2. Buta-1,3-diene is a preferred diene. In addition to the diene residues, the diene copolymers may contain up to 20% by weight, based on the diene copolymer, of residues of other ethylenically unsaturated monomers incorporated by polymerisation, such as residues of styrene, acrylonitrile or esters of acrylic or methacrylic acid with monohydric $C_1$-$C_4$ alcohols, such as methyl acrylate, ethyl acrylate, methyl methacrylate or ethyl methacrylate.

The preparation of the diene rubber graft base C.2 and of the graft polymers C prepared therefrom is described, for example. in "Methoden der Organischen Chemie" (Houben-Weyl), Vol. 14/1, Georg Thieme Verlag, Stuttgart 1961, pages 393–406, and in Ullmanns Encyclopädie der technischen Chemie, 4th Edition, Vol. 19, published by Verlag Chemie, Weinheim, 1981, pages 279–284.

When the graft polymers C are prepared by graft copolymerisation, which is normally carried out in the presence of radical starters such as water-soluble initiators, emulsifiers or complex formers/graft activators as well as molecular weight regulators, a certain amount of free polymers or copolymers of the graft monomers forming the graft shell are generally formed in addition to the graft copolymer proper.

The graft polymer C for the purpose of this invention is therefore the product obtained by the polymerisation of graft monomers C.1 in the presence of the diene rubber C.2.

The moulding compounds according to the invention have optimum properties if the quantities of free (co)polymer in the graft polymer C do not exceed 15% by weight and preferably do not exceed 10% by weight, especially 7% by weight, based on C.

The Staudinger index of these free (co)polymers should be less than 0.6 dl/g, preferably less than 0.4 dl/g, determined in dimethylformamide at 25° C.

The average particle diameter $d_{50}$ is the diameter which is greater than that of 50% by weight of the particles and less than that of the other 50% by weight of the particles. It may be determined by ultracentrifuge measurements (W. Scholtan, H. Lange, Kolloid, Z. und Z. Polymere 250 (1972), 782–796) or by electron microscopy followed by particle count (G. Kämpf, H. Schuster, Angew. makromolekulare Chemie, 14, (1970), 111-129) or by light scattering measurements.

The gel contents of the cross-linked diene rubbers are determined in toluene at 25° C. (M. Hoffmann, H. Krämer, R. Kuhn, Polymeranalytik I and II, Georg Thieme Verlag, Stuttgart 1977).

The radical formers used may be inorganic or organic peroxides or hydroperoxides, e.g. compounds of the formula $R_1OOR_2$ ($R_1=R_2=$alkyl, aryl, acyl, hydrogen: $R_1=$alkyl. acryl, acyl; $R_2=$hydrogen). The total number of carbon atoms in $R_1$ and $R_2$ is <30, preferably <25. Examples include peroxides and hydroperoxides such as dibenzoyl peroxide, tert.-butyl hydroperoxide, cumene hydroperoxide, lauryl peroxide, 2,5-di-tert.- butyl-2,5-dimethylhexyl peroxide, di-tert.-butyl peroxide or dicumyl peroxide.

Inorganic compounds containing a O-O group such as peroxides or per compounds of acids of sulphur, e.g. persulphates, and perborates may also be used as radical formers. Persulphates are preferred, e.g. $K_2S_2O_8$. The following are examples: $(NH_4)_2S_2O_8$, $Na_2S_2O_8$, $Na_2O_2$, $NaBO_3.4H_2O$ and $Na_2B_4O_8.10H_2O$.

The quantity of peroxide/hydroperoxides used is most preferably from 0.05 to 0.30% by weight.

The graft polymers C prepared as described above may be worked up by known methods, e.g. by coagulation of the latices with electrolytes (salts, acids or mixtures thereof) followed by purification and drying.

The moulding compounds according to the invention may also contain the usual quantities of conventional additives for aromatic polyester carbonates, polyalkylene terephthalates or graft polymers, such as stabilizers, pigments, mould release agents, flame retardants and/or antistatic agents.

The moulding compounds according to the invention may be prepared by mixing the components in known manner and melt compounding or melt extruding the resulting mixtures in conventional apparatus such as internal kneaders, extruders or double shaft screws at elevated temperatures, preferably at 200° to 350° C. The individual components may be mixed together successively or simultaneously.

The present invention thus relates to a process for the preparation of thermoplastic moulding compounds containing components A, B and C and optionally stabilizers, pigments, mould release agents, flame retardants and/or antistatic agents, characterised in that the components A, B and C and optionally stabilizers, pigments, mould release agents, flame retardants and/or antistatic agents are mixed together in known manner and melt compounded or melt extruded at elevated temperatures, preferably at temperatures from 200° to 350° C. in conventional apparatus such as internal kneaders, extruders or double screws.

The moulding compounds according to the invention may be used for the production of moulded articles of all types, e.g. by injection moulding. The following are examples of such moulded products: Housing parts (e.g. for domestic appliances such as juice extractors, coffee machines, mixers and microwave equipment), cover plates for the building industry and parts of motor vehicles. They are also used for electrical parts such as socket bars, spool bodies and printed circuits.

Moulded articles may also be produced by deep drawing previously produced panels or sheets.

The invention also relates to the use of the above described moulding compounds for the production of moulded articles.

EXAMPLES

The parts given are parts by weight.

Component A

A 1

Polyester carbonate having an ester content of 50 mol-% based on bisphenol-A and iso- and terephthalic acid (1:1) containing 3 mol-%, based on the bisphenol A units, of p-iso-octylphenyl end groups: relative viscosity $n_{rel}=1.30$ (determined on a solution of 0.5 g of polyester carbonate in 100 ml of $CH_2Cl_2$ at 25° C.).

A 2

Linear polycarbonate based on bisphenol-A having a relative solution viscosity $n_{rel}$ of 1.26 to 1.28 determined in $CH_2Cl_2$ at 25° C. and at a concentration of 0.5 g/100 ml).

Component B

Linear polyethylene terephthalate having an intrinsic viscosity I.V. of 0.85 dl/g determined in phenol/o.dichlorobenzene (1:1) at 25° C. and a concentration of 0.5 g/dl, obtainable from ICI under the Trade name Melinar B 90 S.

Component C

C 1 (Comparison)

Graft polymer of 50 parts by weight of a copolymer of styrene and acrylonitrile in the ratio of 72:28 on 50 parts by weight of a particulate particle diameter $d_{50}=0.4$ μm) prepared by emulsion polymerisation.

C 2 (Comparison)

Graft polymer prepared from 80% by weight of a graft base of cross-linked polybutyl acrylate rubber (cross-linking agent: butylene diacrylate and allyl methacrylate) and 20% by weight of a graft of methyl methacrylate, obtainable from Rohm and Haas under the Trade name Acryloid KM 330.

C 3 (according to the invention)

Graft polymer prepared by the emulsion polymerisation of 80% by weight of a graft base of cross-linked polybutadiene (gel content 85% by weight, determined in toluene) and 20% by weight of a graft of methylmethacrylate and n-butyl acrylate in the ratio of 9:1; average particle diameter $d_{50}=0.4$ μm.

PREPARATION AND TESTING OF THE MOULDING COMPOUNDS ACCORDING TO THE INVENTION

Components A, B and C were melted and homogenised on a 3 l internal kneader at temperatures of 200° to 280° C.

Rods measuring $80\times10\times4$ mm³ were produced from the moulding compounds in an injection moulding machine (operating temperature: 260° C.) and used for determining the notched impact strength (by method ISO 180) at room temperature, 0° C., −10° C., −20° C. and −40° C. The results were used to determine the transition from tough to brittle, i.e. the temperature region at which the first brittleness fractures occur.

The weld line strength was determined from the impact strength according to DIN 53 453 (Charpy method) at the joining seam of test samples measuring $170\times10\times4$ mm³ which had been moulded from two sides (operating temperature: 260° C.).

The moulding compound according to the invention prepared from fully aromatic polyester carbonate, polyalkylene terephthalate and graft polymer (Example 3) has a substantially greater weld line strength and a higher notched impact strength at low temperatures than comparison samples (Examples 1, 2) having the same rubber content. The transition from tough to brittle is either at the same level or shifted to lower temperatures, i.e. the moulding compounds according to the invention still show tough breakage characteristics at low temperatures.

The advantageous properties of the moulding compounds according to the invention are fully preserved or even improved when polyethylene terephthalate or graft polymer components are used in other quantities Examples 4, 5, 7, 8, 9 and 10) or when part of the fully aromatic polyester carbonate is replaced by polycarbonate (Examples 6,7).

TABLE

Composition and properties of the moulding compound

| Example | A1 | A2 | B | C1 | C2 | C3 | Joint seam strength on F kJ/m² | Notched impact strength $a_k$ at $-10°$ C. kJ/m² | Tough/brittle transition °C. |
|---|---|---|---|---|---|---|---|---|---|
| 1 (Comparison) | 68 | — | 17 | 15 | — | — | 7.3 | 36.3 | −20/−30 |
| 2 (Comparison) | 72 | — | 18 | — | 10 | — | 8.0 | 26.2 | −10 |
| 3 | 72 | — | 18 | — | — | 10 | 16.3 | 46.3 | −20/−30 |
| 4 | 75 | — | 15 | — | — | 10 | 14.0 | 42.5 | −30 |
| 5 | 70 | — | 20 | — | — | 10 | 12.7 | 45.0 | −20/−30 |
| 6 | 46.6 | 23.3 | 20 | — | — | 10 | 19.8 | 46.4 | −40 |
| 7 | 35 | 35 | 20 | — | — | 10 | 17.7 | 47.1 | −40 |
| 8 | 65 | — | 20 | — | — | 15 | 16.4 | 35.6 | −40 |
| 9 | 68 | — | 17 | — | — | 15 | 12.0 | 42.0 | −30/−40 |
| 10 | 75 | — | 10 | — | — | 15 | 28.1 | 45.2 | −40/−50 |

We claim:

1. Thermoplastic moulding compounds consisting essentially of
  A. from 50 to 90 parts by weight of a fully aromatic polyester carbonate,
  B. from 10 to 50 parts by weight of one or more thermoplastic polyalkylene terephthalates and
  C. from 3 to 40 parts by weight of a graft polymer consisting of
  C.1 from 5 to 90 parts by weight of a mixture of
  C.1.1 from 20 to 99 parts by weight of methyl methacrylate and
  C.1.2 from 1 to 40 parts by weight of the acrylic acid ester of a primary or secondary monohydric aliphatic $C_2$-$C_{10}$ alcohol in which the sum of the parts by weight of C.1.1 and C.1.2 amount to 100 parts by weight, on
  C.2 from 10 to 95 parts by weight of a cross-linked diene rubber having an average particle diameter of $d_{50}$ of from 0.05 to 1 μm and a gel content of more than 50% by weight, based on the weight of C.2,
in which the sum of the parts by weight of A, B and C is 100 parts by weight.

2. Process for the preparation of the moulding compounds according to claim 1, characterized in that components A, B and C and optionally stabilizers, pigments, mould release agents, flame retardants or antistatic agents or mixtures thereof are mixed together in known manner and melt compounded or melt extruded at elevated temperatures in conventional apparatus.

3. Moulding compounds according to claim 1, characterised in that the graft polymer C is prepared from 10 to 70 parts by weight of graft monomer C.1 and 30 to 90 parts by weight of the diene rubber C.2.

4. Moulding compounds according to claim 1 characterised in that component C.1 consists of 50 to 97 parts by weight of C.1.1 and 1 to 20 parts by weight of C.1.2.

5. Moulding compounds according to claim 1, characterised in that particle diameters of the diene rubbers C.2 are from 0.05 to 0.8 μm.

6. Moulding compounds according to claim 1, characterised in that the gel content of the diene rubber C.2 is more than 70% by weight, based on C.2.

7. Moulding compounds according to claim 1, characterised in that, in addition, they contain at least one additive selected from stabilizers, pigments, mould release agents, flame retardants and antistatic agents.

* * * * *